(12) United States Patent  (10) Patent No.: US 9,341,320 B2
Kim et al.  (45) Date of Patent: May 17, 2016

(54) COVER BOTTOM AND DISPLAY DEVICE USING THE SAME

(71) Applicant: LG DISPLAY CO., LTD., Seoul (KR)

(72) Inventors: Jae Jun Kim, Goyang-si (KR); Sung Hyun Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 259 days.

(21) Appl. No.: 14/139,270

(22) Filed: Dec. 23, 2013

(65) Prior Publication Data

US 2015/0029710 A1    Jan. 29, 2015

(30) Foreign Application Priority Data

Jul. 29, 2013 (KR) ........................ 10-2013-0089507

(51) Int. Cl.
*F21K 99/00* (2010.01)
*F21S 4/00* (2006.01)
*G02F 1/1335* (2006.01)

(52) U.S. Cl.
CPC ... *F21K 9/30* (2013.01); *F21S 4/28* (2016.01); *G02F 1/133608* (2013.01); *G02F 1/133603* (2013.01); *G02F 1/133605* (2013.01); *G02F 2001/133628* (2013.01); *G02F 2201/46* (2013.01); *G02F 2201/465* (2013.01)

(58) Field of Classification Search
CPC ....... F21K 9/30; G02F 1/133608; F21S 4/008
See application file for complete search history.

(56) References Cited

U.S. PATENT DOCUMENTS

| | | | | |
|---|---|---|---|---|
| 8,469,582 B2* | 6/2013 | Kuo | ................... | G02F 1/133608 |
| | | | | 362/633 |
| 2007/0002590 A1 | 1/2007 | Jang | | |
| 2009/0267533 A1* | 10/2009 | Lee | ........................... | G06F 9/33 |
| | | | | 315/294 |
| 2011/0019413 A1 | 1/2011 | Zimmerman et al. | | |
| 2012/0087110 A1 | 4/2012 | Lee | | |
| 2013/0194775 A1* | 8/2013 | Geddes | ................... | F21S 4/008 |
| | | | | 362/11 |
| 2014/0362574 A1* | 12/2014 | Barrett | ..................... | F21S 2/00 |
| | | | | 362/249.03 |

FOREIGN PATENT DOCUMENTS

| | | | |
|---|---|---|---|
| CN | 203162731 U | * | 8/2013 |
| JP | 2008198398 | | 8/2008 |
| JP | 2012529145 A | | 11/2012 |
| KR | 20070002552 A | | 1/2007 |
| KR | 20110003396 U | | 4/2011 |
| TW | M296447 U | | 8/2006 |
| TW | 201106839 A1 | | 2/2011 |

* cited by examiner

*Primary Examiner* — David V Bruce
(74) *Attorney, Agent, or Firm* — Dentons US LLP

(57) ABSTRACT

Disclosed are a cover bottom, which includes a plurality of LED frames with an LED array adhered thereto and a plurality of reinforcing frames coupled to the LED frames in a lattice type, and a display device using the same. The cover bottom includes at least two or more light emitting diode (LED) frames, to which an LED array is adhered, and at least two or more reinforcing frames coupled to the LED frames in a lattice type.

10 Claims, 8 Drawing Sheets

(a)

(b)

COVER BOTTOM AND DISPLAY DEVICE USING THE SAME

CROSS-REFERENCE TO RELATED APPLICATIONS

This application claims the benefit of the Korean Patent Application No. 10-2013-0089507 filed on Jul. 29, 2013, which is hereby incorporated by reference for all purposes as if fully set forth herein.

BACKGROUND OF THE INVENTION

1. Field of the Invention

The present invention relates to a cover bottom and a display device using the same.

2. Discussion of the Related Art

Flat panel display (FPD) devices are applied to various electronic devices such as portable phones, tablet personal computers (PCs), notebook computers, etc. The FPD devices include liquid crystal display (LCD) devices, plasma display panels (PDPs), organic light-emitting display devices, etc. Recently, electrophoretic display (EPD) devices are widely used as the FPD devices.

In such FPD devices (hereinafter simply referred to as a display device), the LCD devices are being most widely commercialized at present because the LCD devices are easily manufactured due to the advance of manufacturing technology and realize drivability of a driver and a high-quality image.

FIG. 1 is an exemplary diagram illustrating a backlight unit according to the related art that includes a cover bottom and arrays of light emitting diode (LED), and FIG. 2 is a plan view illustrating a state in which the LED arrays are mounted on the cover bottom configuring the related art backlight unit.

The related art backlight unit, as illustrated in FIG. 1, includes at least one or more LED arrays 60 and a cover bottom 50 in which an accommodation space with the LED array 60 mounted thereon is formed.

The LED array 60 includes a printed circuit board (PCB) 61 provided in a rod shape and a plurality of LEDs 62 mounted on the PCB 61.

The cover bottom 50 is provided in a plate shape, and includes a bottom, in which a plurality of LED array adhering parts A with the LEDs 62 adhered thereto are provided, and a plurality of side surfaces surrounding a circumference of the bottom.

The LED array 60 is adhered to the bottom of the cover bottom 50 by an adhesive material 70 such as a double-sided tape.

As described above, since the LED array 60 is adhered to the bottom of the cover bottom 50 by the adhesive material 70 such as the double-sided tape, heat is naturally dissipated through the cover bottom 50.

However, in the cover bottom 50 configuring the related art backlight unit, a part other than the LED array adhering parts A to which the LED array 60 is adhered and which performs a heat dissipating function is substantially unnecessary.

That is, each of a plurality of areas B illustrated in FIG. 2 is an empty space between the LED arrays 60, and the empty space is an unnecessary part in the cover bottom 50. Due to a plurality of the unnecessary parts, the cost of the cover bottom 50 increases, and the weight of the cover bottom 50 increases.

SUMMARY OF THE INVENTION

Accordingly, the present invention is directed to provide a cover bottom and a display device using the same that substantially obviate one or more of the problems due to limitations and disadvantages of the related art.

An advantage of the present invention is to provide a cover bottom that includes a plurality of LED frames with an LED array adhered thereto and a plurality of reinforcing frames coupled to the LED frames in a lattice type, and a display device using the same.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the invention, as embodied and broadly described herein, there is provided a cover bottom including: at least two or more light emitting diode (LED) frames, each LED frame having an LED array; and at least two or more reinforcing frames coupled to the at least two or more LED frames in a lattice type.

In another aspect of the present invention, there is provided a display device including: a module including a panel displaying an image; a front cover configured to cover a front surface of the module; and a back cover coupled to the front cover in a state of covering a rear surface of the module, wherein the module includes: a cover bottom including at least two or more light emitting diode (LED) frames, each LED frame having an LED array, and at least two or more reinforcing frames coupled to the at least two or more LED frames in a lattice type; and the panel disposed on the cover bottom.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to exemplary embodiments of the present invention, examples of which are illustrated in the accompanying drawings. The same reference numbers may be used throughout the drawings to refer to the same or like parts.

Hereinafter, embodiments of the present invention will be described in detail with reference to the accompanying drawings.

Figure 1:
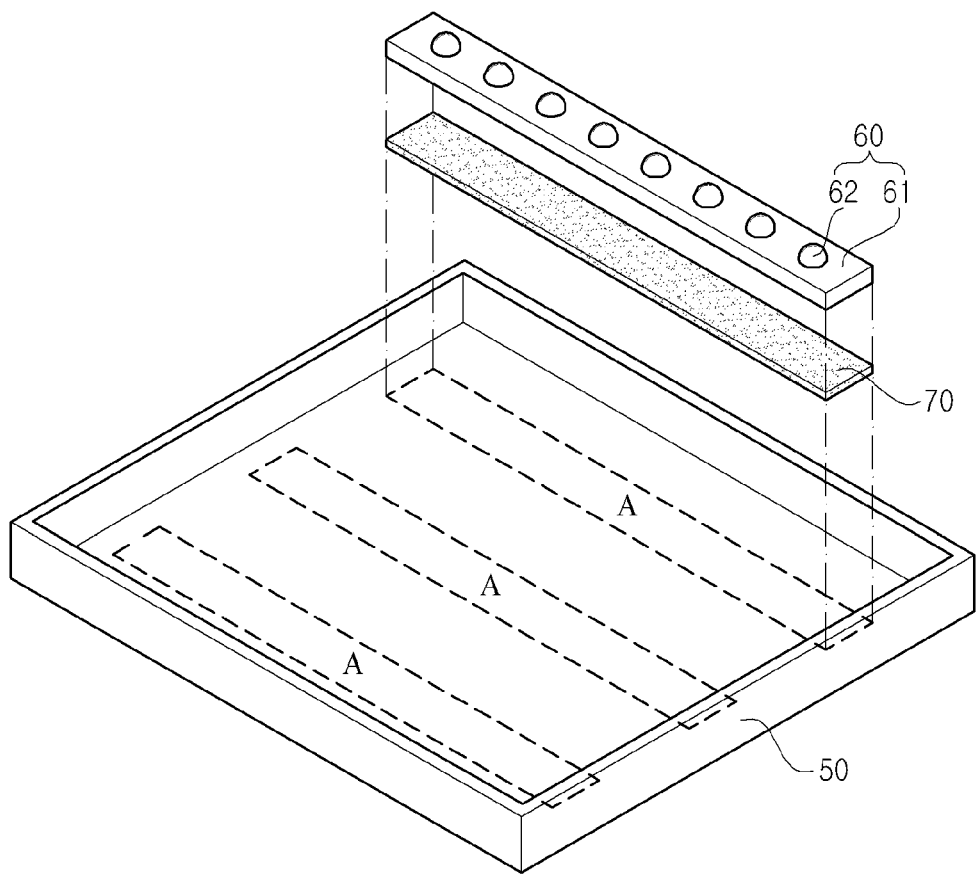
FIG. 1 is an exemplary diagram illustrating a backlight unit according to the related art that includes a cover bottom and arrays of LED.
Figure 2:
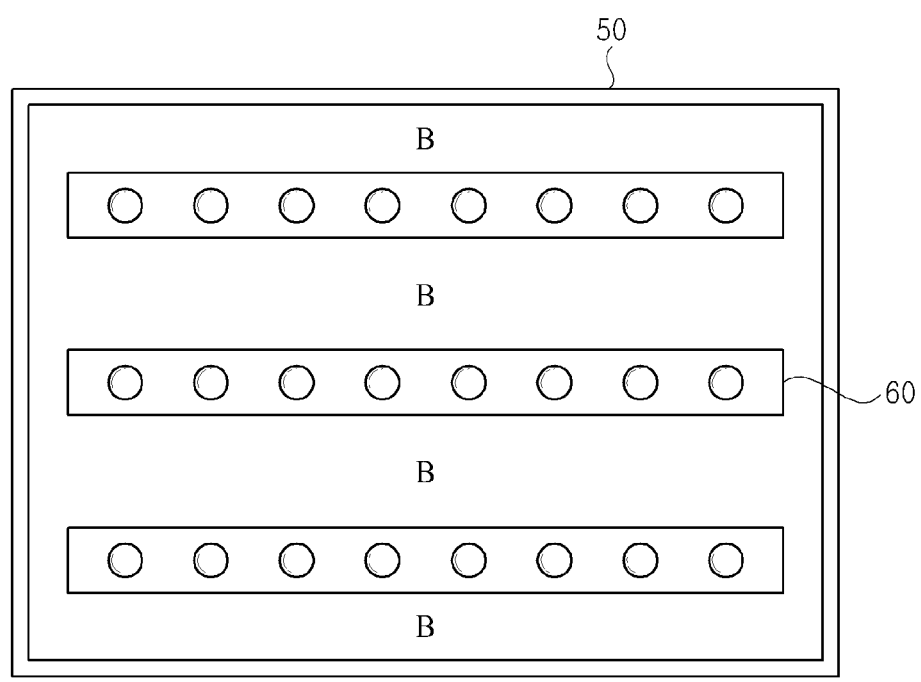
FIG. 2 is a plan view illustrating a state in which the LED arrays are mounted on the cover bottom configuring the related art backlight unit.
Figure 3:
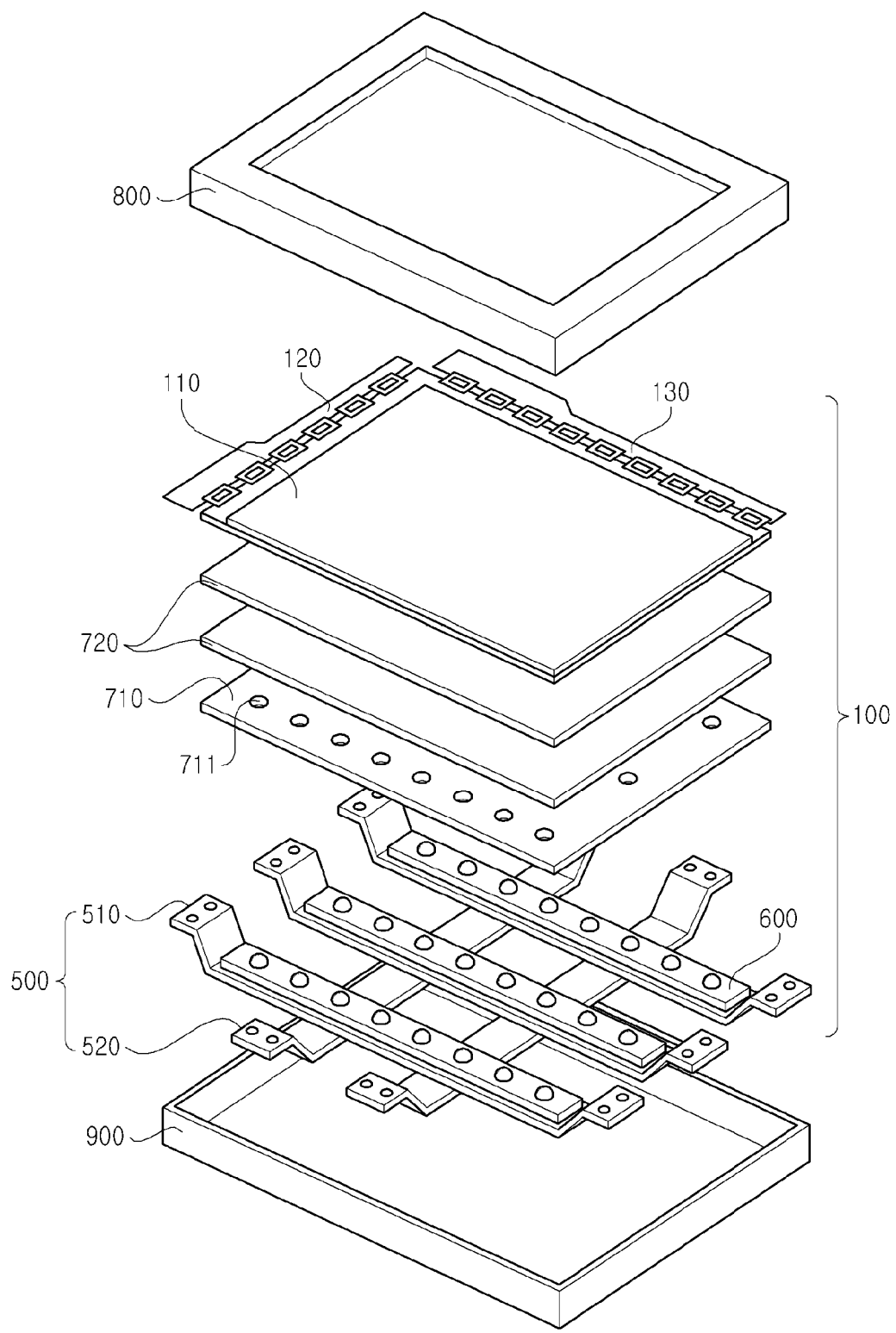
FIG. 3 is a diagram schematically illustrating a display device according to the present invention.
Figure 4:
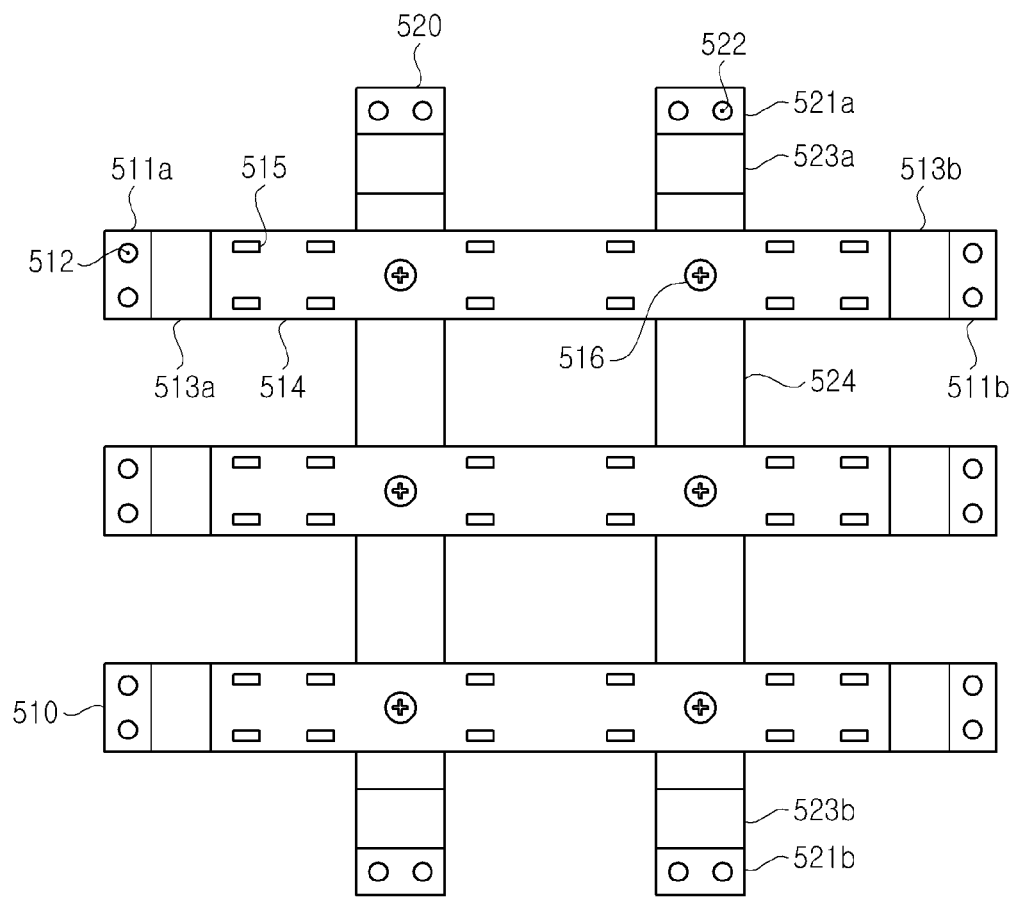
FIG. 4 is a plan view illustrating a cover bottom illustrated in FIG. 3 according to an embodiment of the present invention.
Figure 5:
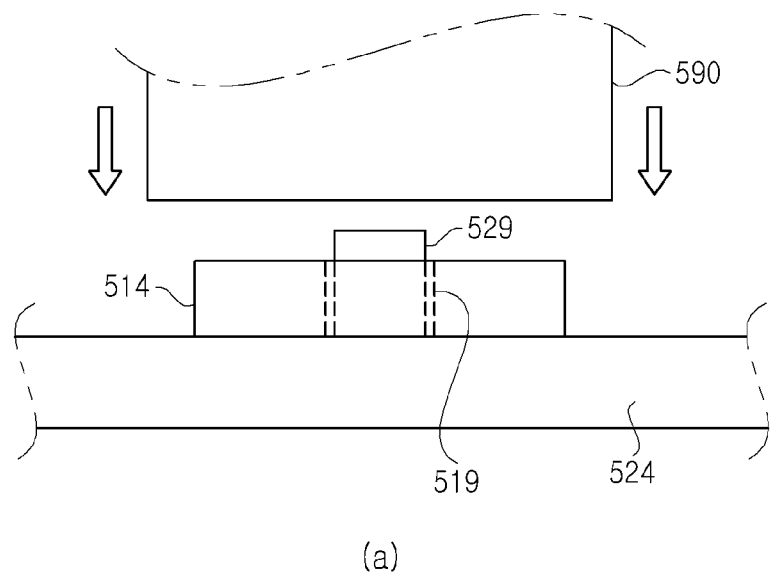
FIG. 5 is an exemplary diagram for describing a method of manufacturing the cover bottom of FIG. 3.
Figure 5:
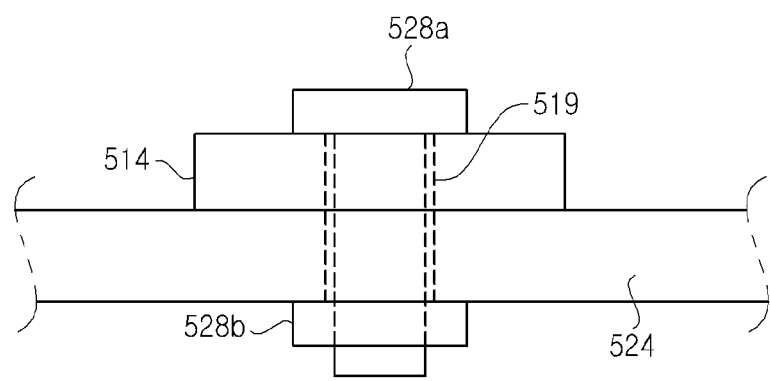
Figure 6:
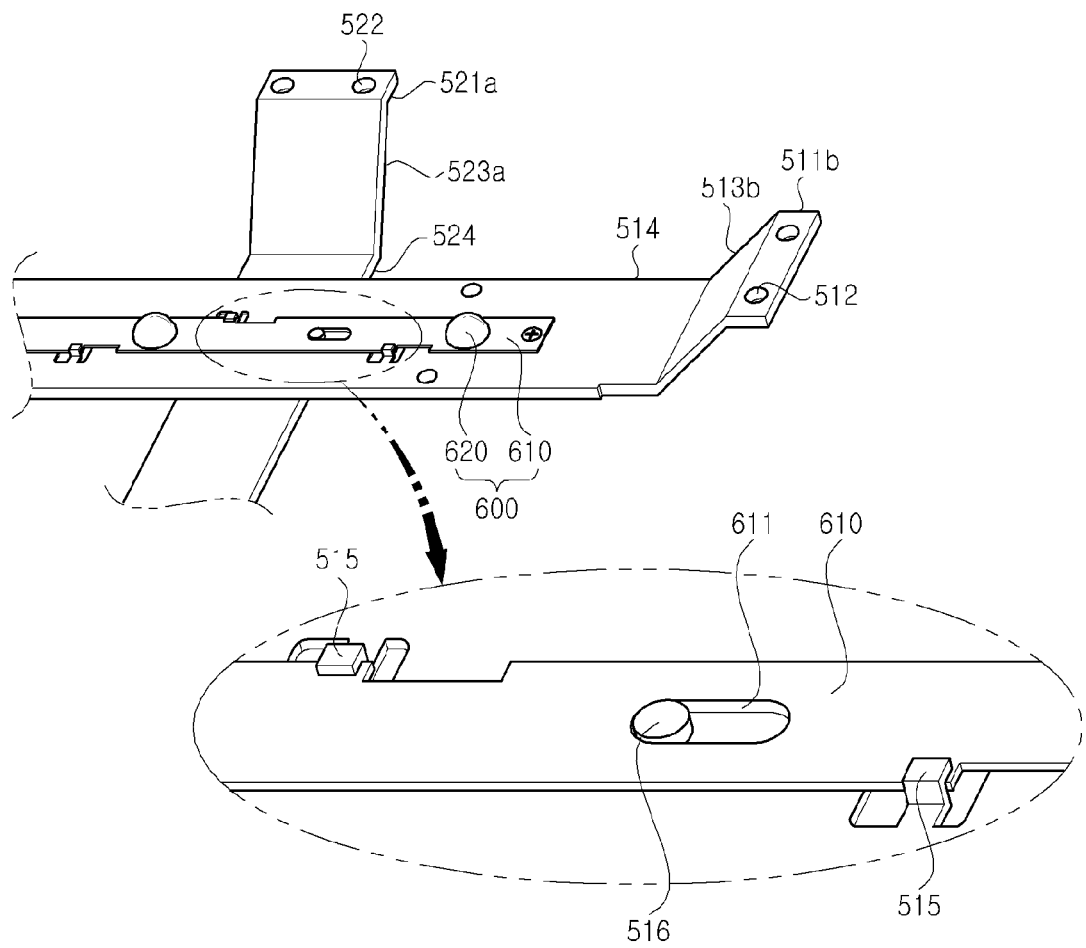
FIG. 6 is an exemplary diagram for describing a method in which an LED array is mounted on the cover bottom of FIG. 3.

FIG. 3 is a diagram schematically illustrating a display device according to the present invention, FIG. 4 is a plan view illustrating an embodiment of a cover bottom illustrated in FIG. 3, FIG. 5 is an exemplary diagram for describing a method of manufacturing the cover bottom of FIG. 3, and FIG. 6 is an exemplary diagram for describing a method in which an LED array is mounted on the cover bottom of FIG. 3.

The display device (for example, an LCD device) according to an embodiment of the present invention, as illustrated in FIG. 3, includes a module 100 that includes a panel 110 displaying an image, a front cover 800 that covers a front surface of the module 100, and a back cover 900 that is coupled to the front cover 800 in a state of covering a rear surface of the module 100.

The front cover 800 is coupled to the back cover 900 to enable the module 100 to be built into the display device.

The front cover 800, as illustrated in FIG. 3, may cover a front surface of the panel 110. However, in a display device manufactured to have a narrow bezel, the front cover 800 may be provided to support a side surface of the panel 110.

The back cover 900 is coupled to the front cover 800 in a state of covering the rear surface or a bottom of the module 110. A partition wall, which covers an open area between a plurality of reinforcing frames 520 and an LED frame 510 of the cover bottom 500 configuring the module 100, is formed at an inner surface of the back cover 900 contacting the cover bottom 500. The back cover 900 will be described in detail with reference to FIGS. 7 and 8.

The module 100 includes: at least two or more LED frames 510 to which an LED array 600 is adhered; a cover bottom 500 that includes at least two or more reinforcing frames 520 coupled to the LED frames 510 in a lattice type; the panel 110 that is disposed over the cover bottom 500; a plurality of drivers 120 and 130 that drive the panel 110; a reflector 710 in which a plurality of LED holes, through which a plurality of LEDs mounted on the LED array 600 pass, are formed, and which is disposed at an upper end surface of the cover bottom 500 to reflect light, emitted from the LEDs, toward the panel 110; and an optical sheet 720 that is disposed between the reflector 710 and the panel 110.

First, the panel 110 drives a liquid crystal between an upper substrate and a lower substrate by using a voltage applied to the lower substrate, thereby displaying an image according to a transmission amount of light emitted from the LED array 600. The panel 110 may be configured as various types.

The panel 110 includes first and second substrates facing-coupled to each other and a liquid crystal layer formed between the first and second substrates.

The first substrate includes a display area, which includes a plurality of pixels respectively formed in a plurality of pixel areas defined by intersections between a plurality of gate lines and a plurality of data lines, and a non-display area that is provided near the display area. Each of the plurality of pixels displays an image according to a scan signal supplied through a corresponding gate line and a data voltage supplied through a corresponding data line. Each pixel may include at least one thin film transistor (TFT) and at least one capacitor.

The second substrate covers all parts of the first substrate except a portion of the non-display area. A color filter layer may be formed on the second substrate. The TFT formed in each pixel is turned on by the scan signal supplied through a corresponding gate line, and supplies the data voltage, supplied through a corresponding data line, to a pixel electrode formed in a corresponding pixel or emits an organic light emitting diode (OLED) formed in the corresponding pixel.

The liquid crystal layer with the liquid crystal charged thereinto is formed between the first and second substrates.

The panel 110 is manufactured by a process of coupling the first substrate to the second substrate. When the driver 120 for driving the panel 110 is connected to the panel 110, an image may be output from the panel 110.

Second, the driver includes a gate driver 120, a data driver 130, and a timing controller (not shown).

The gate driver 120 supplies a scan signal to the gate lines by using gate control signals generated by the timing controller.

The gate driver 120, as illustrated in FIG. 3, may be provided independent of the panel 110, and may be electrically connected to the panel 110 in various types. However, the gate driver 120 may be provided in a gate-in panel (GIP) type which is built into the panel 110.

The data driver 130 converts digital image data, transferred from the timing controller, into analog data voltages, and respectively supplies the data voltages for one horizontal line to the data lines at every one horizontal period in which the scan signal is supplied to one gate line.

The data driver 130 converts the digital image data into the data voltages by using gamma voltages supplied from a gamma voltage generator (not shown), and respectively outputs the data voltages to the data lines.

To this end, the data driver 130 includes a shift register, a latch, a digital-to-analog converter (DAC), and an output buffer.

The shift register outputs a sampling signal by using data control signals received from the timing controller.

The latch latches the digital image data sequentially received from the timing controller, and then simultaneously outputs the latched image data to the DAC.

The DAC simultaneously converts the image data, transferred from the latch, into positive or negative data voltages, and outputs the positive or negative data voltages. That is, the DAC converts the digital image data into the positive or negative data voltages according to a polarity control signal transferred from the timing controller by using the gamma voltages supplied from the gamma voltage generator (not shown), and respectively outputs the positive or negative data voltages to the data lines.

The output buffer respectively outputs the positive or negative data voltages, transferred from the DAC, to the data lines of the panel 110 according to a source output enable signal transferred from the timing controller.

The timing controller (not shown) generates a gate control signal GCS used to control an operation timing of the gate driver 120 and a data control signal DCS used to control an operation timing of the data driver 130 by using a timing signal (i.e., a vertical sync signal Vsync, a horizontal sync signal Hsync, and a data enable signal DE) input from an external system (not shown), and converts, video data input from the external system, into image data to be transferred to the data driver 130.

Third, the plurality of LED holes through which the plurality of LEDs mounted on the LED array 600 pass are formed at the reflector 710, which is disposed at the upper end surface or front surface of the cover bottom 500 to reflect light, emitted from the LEDs, toward the panel 110.

Fourth, the optical sheet 720 is disposed between the reflector 710 and the panel 110, and allows the light, emitted from the LEDs 620, to be incident on the panel 110 in a direction vertical to the bottom of the panel 110.

That is, the optical sheet 720 diffuses the light, or allows the light to be vertically incident on the panel 110. The optical sheet 720 may include a diffusive sheet, a prism sheet, and a protective sheet.

Here, the diffusive sheet diffuses the light emitted from the LEDs 620 to uniformly supply the light to the panel 110 disposed on the optical sheet 720. The prism sheet disposed on the diffusive sheet allows the light to vertically travel toward the panel 110, thereby enhancing luminance. The protective sheet is provided on the prism sheet, and protects the diffusive sheet and the prism sheet which are sensitive to dust or scratch.

Fifth, the LED array 600 includes the LEDs 620 emitting the light and a PCB 610 on which the at least one or more LEDs 620 are mounted on and which is provided in a rod shape.

The PCB 610 is mounted on the LED frame 510 configuring the cover bottom 500.

Sixth, the cover bottom 500 includes the at least two or more LED frames 510, to which the LED array 600 is adhered, and the at least two or more reinforcing frames 520 coupled to the LED frames 510 in a lattice type.

The LED frame 510, as illustrated in FIGS. 4 and 6, includes: an LED bar 514 to which the LED array 600 is fixed; a first bending part 513a that is bent in a direction from a distal end of one side to an upper end of the LED bar 514; a second bending part 513b that is bent in a direction from a distal end of the other side to the upper end of the LED bar 514; a first extension part 511a that extends from the first bending part 513a in parallel with the LED bar 514; and a second extension part 511b that extends from the second bending part 513b in parallel with the LED bar 514.

The LED bar 514 may be formed of a metal material for dissipating heat. The LED bar 514 is formed longer than the LED array 600.

A height of the cover bottom 500 is determined according to a length and a slope angle of each of the first and second bending parts 513a and 513b.

A plurality of holes 512 having various sizes and shapes may be formed in each of the first and second extension parts 511a and 511b such that various elements configuring the module 100, the front cover 800, or the back cover 900 are coupled to the first and second extension parts 511a and 511b.

At least two or more latches 515 for fixing the LED array 600, as illustrated in FIGS. 4 and 6, are provided at the LED bar 514.

The latches 515 may be provided by a process that punches the LED bar 514 to form a latch bar, and then bends the latch bar.

The latches 515 may be provided to face each other or to face each other in a dislocate state, in a length direction of the LED array 600.

A process of mounting the LED array 600 on the LED bar 514 can be simplified by the latches 515. Since the LED array 600 directly contacts a surface of the LED bar 514, a heat dissipation efficiency can be improved.

As illustrated in an enlarged circular block of FIG. 6, a guide projection 516, which is inserted into an LED array groove 611 formed at the PCB 610 of the LED array 600 to guide the LED array 600, may be formed at the LED bar 514 of the LED frame 510.

A manufacturer may fix the LED array 600 to the LED bar 514 by using the latches 515 in a state where the guide projection 516 is disposed to be inserted into the LED array groove 611. That is, the guide projection 516 aligns the LED array 600 on the LED bar 514.

The reinforcing frame 520 is fixed to the LED frame 510, and includes: an reinforcing bar 524 coupled to the LED bar 514 of the LED frame 510; a third bending part 523a that is bent in a direction from a distal end of one side to an upper end of the reinforcing bar 524; a fourth bending part 523b that is bent in a direction from a distal end of the other side to the upper end of the reinforcing bar 524; a third extension part 521a that extends from the third bending part 523a in parallel with the reinforcing bar 524; and a fourth extension part 521b that extends from the fourth bending part 523b in parallel with the reinforcing bar 524.

The reinforcing bar 524 may be formed of a metal material for dissipating heat.

A height of the cover bottom 500 is determined according to a length and a slope angle of each of the third and fourth bending parts 523a and 523b. The length and slope angle of each of the third and fourth bending parts 523a and 523b may be formed identically to or differently from the length and slope angle of each of the first and second bending parts 513a and 513b.

A plurality of holes 522 having various sizes and shapes may be formed in each of the third and fourth extension parts 521a and 521b such that various elements configuring the module 100, the front cover 800, or the back cover 900 are coupled to the third and fourth extension parts 521a and 521b.

The LED frame 510 and the reinforcing frame 520 may be coupled to each other by various methods.

For example, as illustrated in FIG. 4, the LED frame 510 and the reinforcing frame 520 may be coupled to each other by a screw 516.

That is, the LED frame 510 and the reinforcing frame 520 may be coupled to each other by passing the screw 516 through a hole formed at each of the LED frame 510 and the reinforcing frame 520.

Moreover, the LED frame 510 and the reinforcing frame 520 may be coupled to each other by a method which is illustrated in FIG. 5(a).

A protrusion 529 is formed at the reinforcing frame 520, and a through hole 519 through which the protrusion 529 passes is formed at the LED frame 510. With the protrusion 529 passing through the through hole 519, the protrusion 529 covers the through hole 519 by hitting a distal end of the protrusion 529 with a hit means 590 such as a hammer, thereby coupling the LED frame 510 to the reinforcing frame 520.

The protrusion 529 is dented and flattened by a hit by the hit means 590, and a dented portion of the protrusion 529 stops up the through hole 519, thus preventing the protrusion 529 from deviating from the through hole 519 formed at the LED frame 510.

To this end, the protrusion 529 may be formed of a soft material such as copper among metal materials.

Moreover, as illustrated in FIG. 5(b), the LED frame 510 and the reinforcing frame 520 may be coupled to each other by a bolt 528a and a nut 528b.

In detail, the through hole 519 is formed at each of the LED frame 510 and the reinforcing frame 520. The bolt 528a passes through the through hole 519 formed at the LED frame 510 and the through hole 519 formed at the reinforcing frame 520, and protrudes to a bottom of the reinforcing frame 520. A distal end of the bolt 528a protruding to the bottom is coupled to the nut 528b. Therefore, the bolt 528a can be prevented from deviating from the through hole 519 formed at each of the LED frame 510 and the reinforcing frame 520.

The number of LED frames 510 and the number of reinforcing frames 520 may be variously set according to the size and shape of the cover bottom 500.

As an example, the cover bottom 500 illustrated in FIG. 3 includes three LED frames 510 and two reinforcing frames 520.

Figure 7:
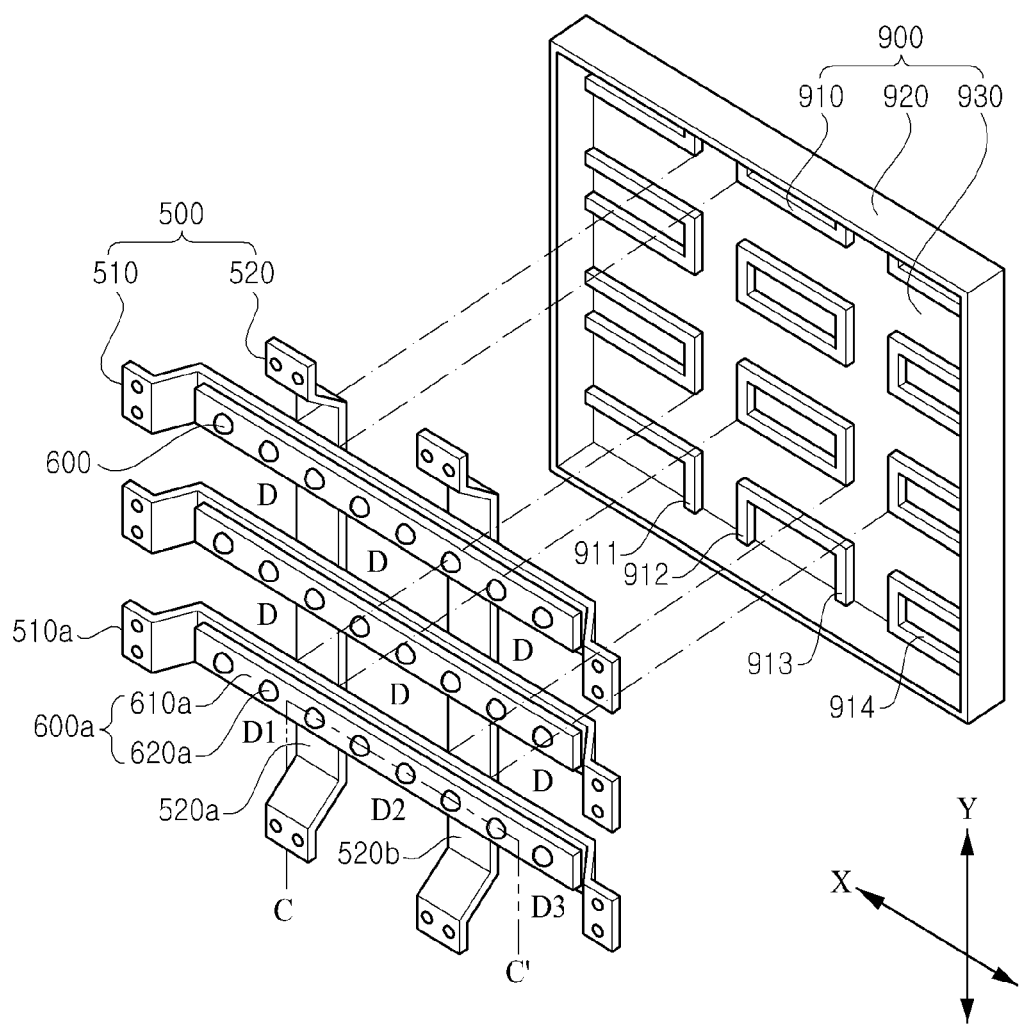
FIG. 7 is a perspective view illustrating an inner surface of a back cover with the cover bottom accommodated therein according to an embodiment of the present invention.
Figure 8:
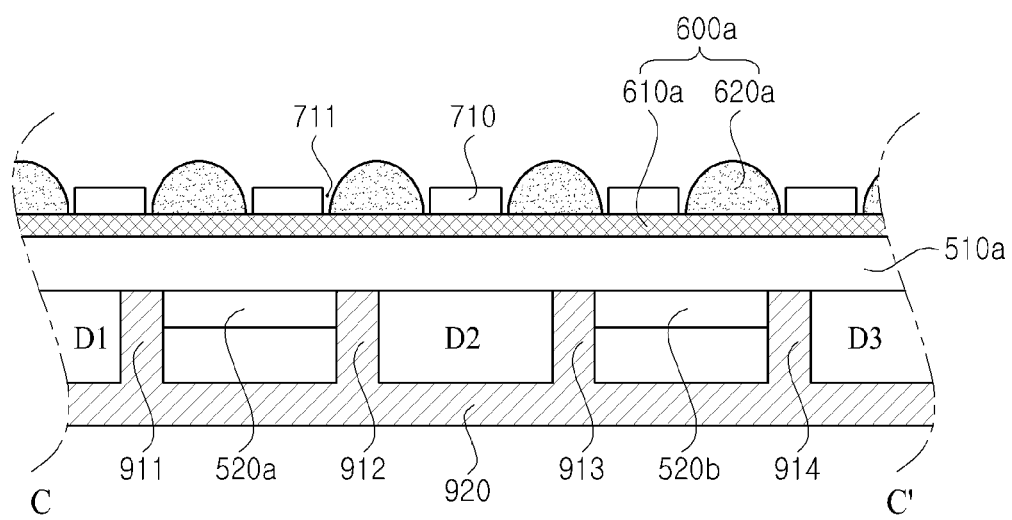
FIG. 8 is a cross-sectional view illustrating a state in which the cover bottom according to an embodiment of the present invention is accommodated in the back cover.

FIG. 7 is a perspective view illustrating an inner surface of the back cover with the cover bottom accommodated therein according to an embodiment of the present invention. FIG. 8 is a cross-sectional view illustrating a state in which the cover bottom according to an embodiment of the present invention is accommodated in the back cover, and is an exemplary diagram illustrating a cross-sectional surface taken along line C-C' of FIG. 7 in a state where the cover bottom 500 is coupled to the back cover 900.

The back cover 900, as illustrated in FIG. 7, includes a bottom part 930 disposed to face the cover bottom 500 and a plurality of side parts 920 extending from the bottom 930.

As illustrated in FIG. 7, a partition wall 910 covering an open area D between the LED frame 510 and the reinforcing frames 520 is formed at an inner surface of the bottom part 930 contacting the cover bottom 500.

Although not shown, a plurality of grooves having various shapes may be formed in the back cover 900 so as to dissipate heat. Foreign materials may penetrate between the cover bottom 500 and the back cover 900 through the grooves.

The foreign materials penetrating between the cover bottom 500 and the back cover 900 may be transferred to the cover bottom 500 through the open area D, and may be adsorbed to the LEDs 620 of the LED array 600 mounted on the LED frame 510, or may be adsorbed to various circuits provided on the PCB 610. In this case, an emission efficiency of the LEDs 620 can be reduced, and short circuit can occur in the PCB 610.

To prevent such problems, the partition wall 910 is formed at the inner surface of the back cover 900 according to an embodiment of the present invention, The partition wall 910 is formed at the inner surface so as to cover a plurality of the open areas D between the LED frame 510 and the reinforcing frames 520.

With the cover bottom 500 being coupled to the back cover 900, referring to FIG. 8 illustrating the cross-sectional surface taken along line C-C' of FIG. 7, a first partition 911 covers a first open area D1 formed at the left of a lower end of the cover bottom 500, second and third partition walls 912 and 913 cover a second open area D2 between the two LED frames 510, and the third partition wall 913 covers a third open area D3 formed at the right of the lower end of the cover bottom 500.

Therefore, the foreign materials penetrating between the cover bottom 500 and the back cover 900 through the back cover 900 may be blocked by the partition walls, and may not be transferred to the LED array 600 disposed on the LED frame 510.

As described above, a plurality of LED holes 711 are formed at the reflector 710, and as illustrated in FIG. 8, a plurality of LEDs 620a pass through the reflector 710 through the LED holes 711.

To clearly illustrate the elements, in FIGS. 7 and 8, new reference numerals are given to the cover bottom 500 and the LED array 600.

That is, among the LED frames 510 of FIG. 7, an LED frame disposed at the lowermost end is referred to by reference numeral 510a, an LED array mounted on the LED frame 510a is referred to by reference numeral 600a, and two reinforcing frames mounted on the LED frame 510a are respectively referred to by reference numerals 520a and 520b.

Moreover, a PCB and an LED which configure the LED array 600 are respectively referred to by reference numerals 610a and 620a.

A shape and position of each of the partition walls 910 may be variously determined according to the size and shape of each of the cover bottom 500 and the back cover 900.

That is, as illustrated in FIG. 7, each of the partition walls 910 may be formed in a tetragonal shape, or may be formed in a bar shape which is separated from each other.

Moreover, various circuit boards may be disposed between the cover bottom 500 and the back cover 900, in which case the partition wall 910 may not be formed at a position with the circuit board disposed therein.

According to the present invention, volume of the elements configuring the cover bottom is reduced, and thus, the manufacturing cost can be reduced.

Moreover, according to the present invention, since volume of the elements configuring the cover bottom is reduced, weight of the cover bottom can be reduced.

Moreover, according to the present invention, the adhesive material such as the double-sided tape is not needed, and thus, the manufacturing cost of the cover bottom can be reduced.

Moreover, according to the present invention, the same heat-dissipating effect as that of when using the double-sided tape can be obtained.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A cover bottom comprising:
   at least two or more light emitting diode (LED) frames, each LED frame having an LED array; and
   at least two or more reinforcing frames coupled to the at least two or more LED frames in a lattice type.

2. The cover bottom of claim 1, wherein each LED frame is coupled to each reinforcing frame by a screw.

3. The cover bottom of claim 1, wherein,
   a protrusion is formed at the reinforcing frame,
   a through hole through which the protrusion passes is formed at the LED frame, and
   with the protrusion passing through the through hole, the protrusion covers the through hole by hitting a distal end of the protrusion, thereby coupling the LED frame to the reinforcing frame.

4. The cover bottom of claim 1, wherein at least two or more latches for fixing the LED array are formed at the LED array.

5. The cover bottom of claim 1, wherein,
   the LED frame is provided as three, and
   the reinforcing frame is provided as two.

6. The cover bottom of claim 1, wherein the LED frame comprises:
   an LED bar to which the LED array is fixed;

a first bending part bent in a direction from a distal end of one side to an upper end of the LED bar;

a second bending part bent in a direction from a distal end of the other side to the upper end of the LED bar;

a first extension part extending from the first bending part in parallel with the LED bar; and a second extension part extending from the second bending part in parallel with the LED bar.

7. The cover bottom of claim 1, wherein the reinforcing frame comprises:

an reinforcing bar coupled to the LED frame;

a third bending part bent in a direction from a distal end of one side to an upper end of the reinforcing bar;

a fourth bending part bent in a direction from a distal end of the other side to the upper end of the reinforcing bar;

a third extension part extending from the third bending part in parallel with the reinforcing bar; and a fourth extension part extending from the fourth bending part in parallel with the reinforcing bar.

8. The cover bottom of claim 1, wherein a guide projection, which is inserted into an LED array groove formed at the LED array to guide the LED array, is formed at the LED frame.

9. A display device comprising:

a module including a panel displaying an image;

a front cover configured to cover a front surface of the module; and a back cover coupled to the front cover in a state of covering a rear surface of the module, wherein the module comprises:

a cover bottom including at least two or more light emitting diode (LED) frames, each LED frame having an LED array, and at least two or more reinforcing frames coupled to the at least two or more LED frames in a lattice type; and the panel disposed on the cover bottom.

10. The display device of claim 9, wherein a partition wall covering an open area between the LED frame and the reinforcing frames is formed at an inner surface of the back cover contacting the cover bottom.

* * * * *